Figure 1:
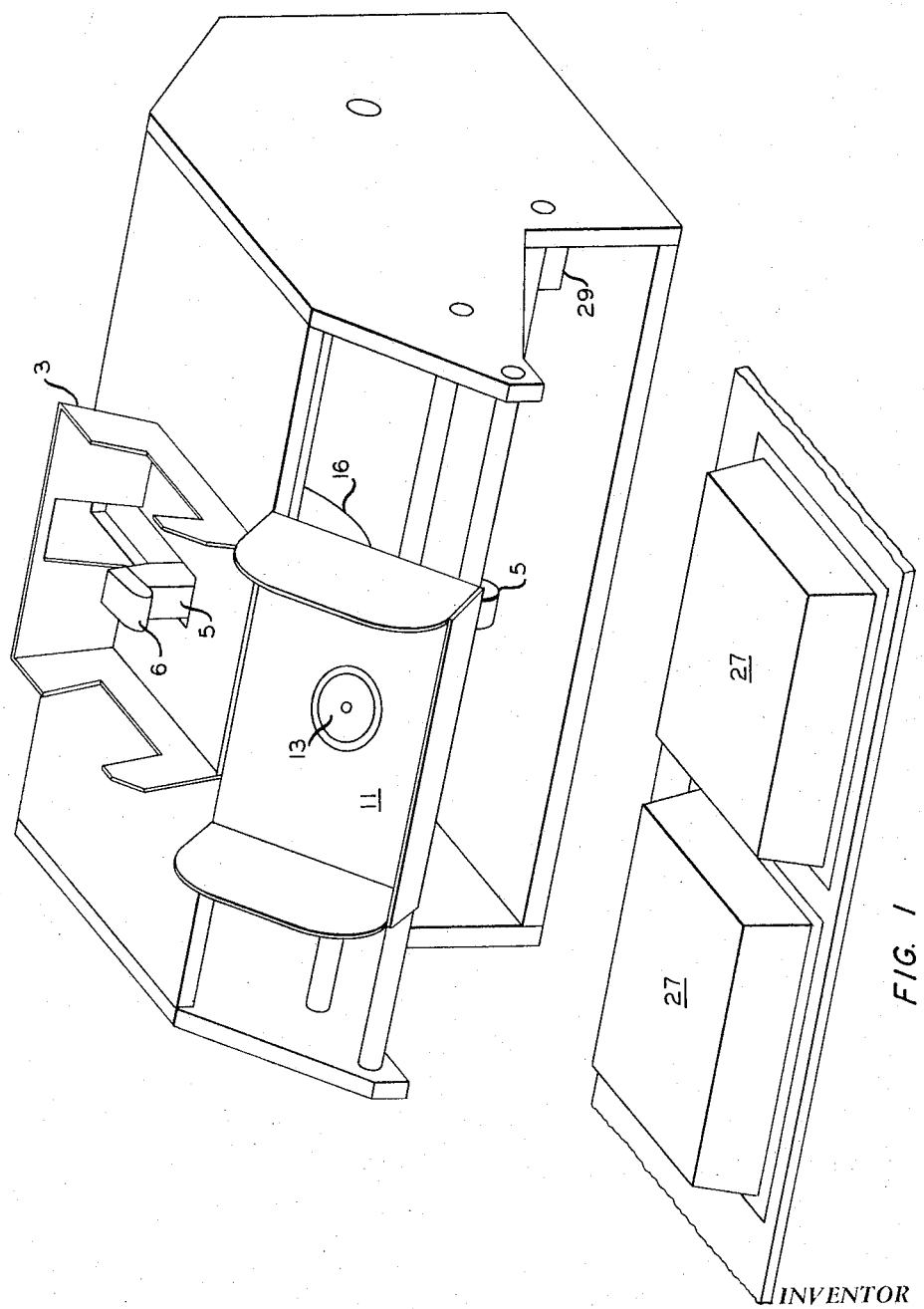

INVENTOR
H. W. BAER

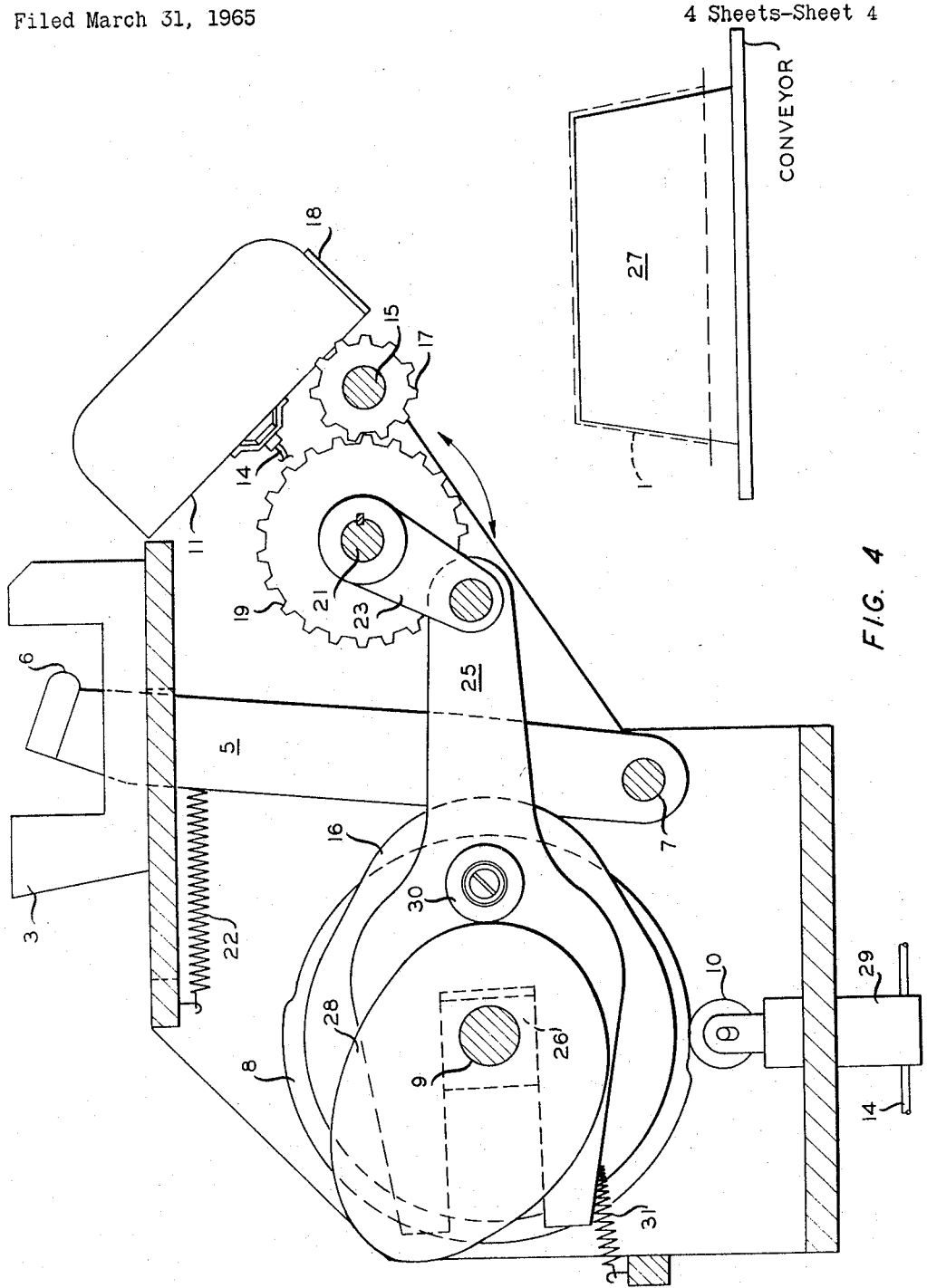

United States Patent Office 3,300,064
Patented Jan. 24, 1967

3,300,064
CONTAINER INVERTER
Herman W. Baer, Rochelle Park, N.J., assignor to Phillips Petroleum Company, a corporation of Delaware
Filed Mar. 31, 1965, Ser. No. 444,248
11 Claims. (Cl. 214—1)

This invention relates to container inverters. In one of its aspects, it relates to a method for inverting an open top container comprising pushing a container onto a rotatable platform, holding said container on said rotatable platform, rotating the platform to invert the container, and releasing the container. In a more specific aspect, a suction cup is used to hold the container on the rotatable platform. In another of its aspects, the invention relates to an apparatus for inverting a container comprising a platform for positioning the container, a pusher arm for pushing the container onto a rotatable platform, a rotatable platform, a means for holding the container on the rotatable platform, means for rotating the platform to invert the container, and means for releasing the container. In a more specific aspect, the apparatus uses a cam surface to actuate the movements of the pusher arm, a cam surface to actuate the means for holding and releasing the container, and a cam surface for actuating the movement of the rotatable platform. In a still more specific aspect, the means for holding and releasing the container consists of a suction cup and a means for drawing a vacuum.

In mechanized operations wherein open top containers, such as those used for frozen foods and the like, are separated from one another, fed onto a conveyor belt, filled, and sealed, it is necessary to invert containers for filling or printing purposes. In one operation it is desirable to print on the underside of a container. Thus, the containers fed to a conveyor belt must be inverted and placed on a mandrel which serves as a backing surface for the printing operation.

Many methods for inverting containers have been proposed. One method is to push the containers through a C-shaped tube or chute so that the container enters right-side-up and exits up-side-down. In another method, a container is grasped at one end and pressure is applied to the bottom surface along the container to pivot the container around the fixed end. It has now been discovered that a simple, easy and efficient method and apparatus for inverting containers can be provided by using a pusher arm, a rotatable platform, and a suction means, all of which are cam operated.

It is therefore an object of this invention to provide a simple, efficient method for inverting a container. It is a further object of this invention to provide a simple, efficient apparatus for inverting containers.

Other aspects, objects and the several advantages of this invention are apparent from a study of this disclosure, the drawings, and the appended claims.

According to the invention, there is provided a method and apparatus for inverting a container. The method comprises positioning a container on a stationary platform, pushing the container onto a rotatable platform, holding the container on the rotatable platform while the container is inverted, and releasing the container.

The apparatus of the invention broadly consists of a means for pushing a container onto a rotatable platform, a means for holding the container on a rotatable platform, a means for inverting the rotatable platform, and a means for releasing the container. More specifically, the means for pushing a container onto a rotatable platform consists of a cam operated pusher arm, the means for holding the container and releasing the container consists of a vacuum cup with a means for drawing a vacuum operatively connected to a cam operated valving means, and the means for rotating the platform around one of its ends consists of a cam operated reciprocating member, a rotatable member which transfers reciprocating motion to a shaft, a gear reducing means, and a means for rigidly attaching one end of the rotatable platform on a rotatable shaft.

Figure 2:
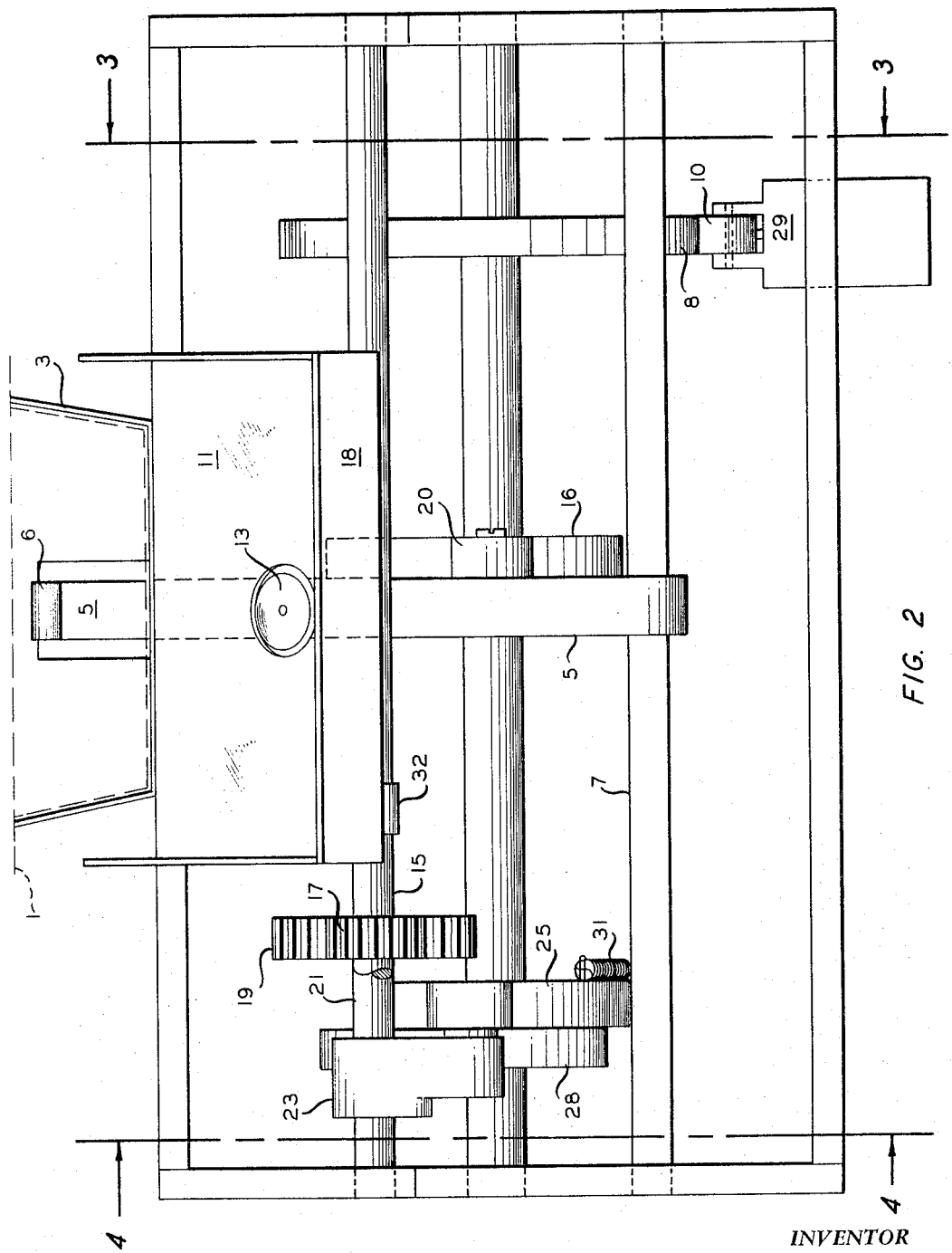
Figure 3:
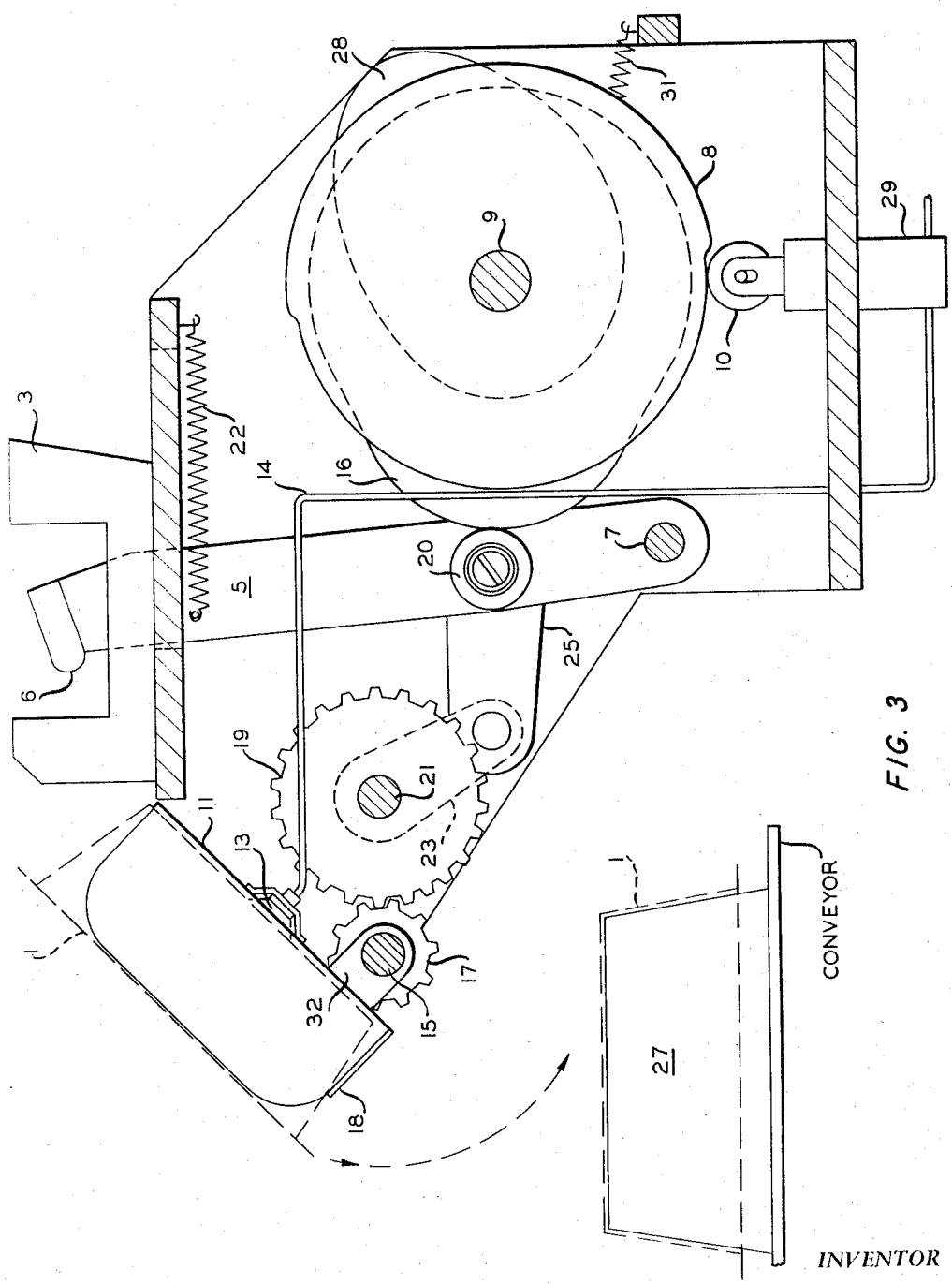

The invention can be better understood by reference to the accompanying drawings. FIGURE 1 shows a perspective view of the apparatus including the mandrel arm on to which the container drops. FIGURE 2 is an end view of the machine looking along the direction of a plane in which the movement of the container can be traced. FIGURE 3 is a sectional view along line 3—3 of FIGURE 2 showing the vacuum valving apparatus including the vacuum cup. FIGURE 4 is a sectional view along line 4—4 of FIGURE 2 showing the rotatable platform actuation assembly including the gear reducing means.

Referring now to the drawings, a stationary platform 3 has a container 1 placed on it. A pusher arm 5 with a blunted end 6 is pivoted at 7. Rotatable platform 11 is provided with suction cup 13, which has vacuum draw lines 14 and a vacuum valve 29 attached to lines 14. Valve 29 controls the vacuum drawn in lines 14 and hence in vacuum cup 13. The valve 29 is actuated by cam follower 10 which is operatively engaged to cam surface 8 which rotates with shaft 9. In this embodiment of the invention, all power supplied to the machine is supplied to shaft 9. Shaft 9 also drives a cam 16, which actuates pusher arm 5 by contacting cam follower 20 fastened on pusher arm 5. Tension spring 22 biases cam follower 20 against cam 16. Shaft 9 supports reciprocating member 25 which at one end is slidably attached thereto through member 26. A cam 28 in contact with cam follower 30 attached to member 25, actuates the reciprocating motion of member 25. A tension spring 31 biases cam follower 30 to cam surface 28. Connecting rod 23 is rotatably attached to the other end of reciprocating member 25. Connecting rod 23 is rigidly attached to shaft 21 and transfers the reciprocating motion of member 25 to shaft 21. The motion of shaft 21 is transferred to shaft 15 through gears 19 and 17. Connecting member 32 is rigidly attached to shaft 15 and transfers the motion of shaft 15 to rotatable platform 11, member 32 being rigidly attached to one end of platform 11. Plate 18 attached to platform 11 prevents container 1 from slipping off the platform.

In operation, a container 1 is placed on stationary platform 3 by a conveyor belt or other suitable positioning means such as a denester. Pusher arm 5 actuated through cam 16 and cam follower 20 pushes the container onto rotatable platform 11. Cam 8 rotating on shaft 9 actuates valve 29 to allow a vacuum to be drawn through lines 14 and vacuum cup 13. The container is held on rotatable platform 11 by the vacuum in vacuum cup 13. Cam 28 actuates reciprocating member 25 which transfers the rotatable motion to shaft 15 through connecting member 23 and gear reducing means 19 and 17. Rotation of shaft 15 causes rotatable platform 11 to rotate with shaft 15 so that container 1 is substantially up-side-down.

It can be seen from FIGURE 5 that reciprocating member 25 rotates shaft 21 through an angle of, for example, 66°. This rotation of shaft 21 transmitted to shaft 15 will vary according to the size of the gear reducing means. If the radius of gears 17 is half that of gear 19, for example, shaft 15 will rotate twice as much as shaft 21, or for example, 132°. Larger movements of member 25 will impart larger rotational motions to shafts 21 and shaft 15. Further, it is obvious that greater rotational motion can be supplied to shaft 15 by increasing the ratio of the size of gear 19 to that of gear 17.

It is obvious that other means can be provided for transferring the reciprocating motion of member 25 to rotatable motion of shaft 15. When platform 11 is positioned so that container 1 is substantially up-side-down, cam 8 actuates valve 29 to release the vacuum in lines 14 and cup 13. The container then drops off platform 11 onto mandrel 27. Movement of the reciprocating member 25 back toward shaft 9, the movement being actuated by spring 31 and cam 28, causes platform 11 to rotate back around shaft 15 into its initial position. The cycle can then begin anew.

It is obvious that other means can be provided for maintaining the container on the rotatable platform 11. For example, the platform can contain a series of holes which draw a vacuum in place of suction cup 13. Alternately, different means of applying a differential pressure between the underside of the container and upper side of the container can be provided. For example, an air blowing tube could be provided over rotatable platform 11 to blow air into the inner portion of the container once the container has been placed on the platform 11. After inversion of platform 11, the blowing could be cut off and the container would fall from platform 11.

It is conceivable that mechanical means could be used to hold containers on platform 11. For example, a pair of fingers could be provided to hold the edges of the container to the platform. When the platform has been inverted, the fingers could be released and the container would fall from the platform.

The platform 11 can rotate about any axis which will invert the same. Generally, it is preferred to rotate the platform about an axis parallel to one of its edges. This axis can be located in the central portion as well as the end portion of the platform.

EXAMPLE I

A container made of linear polyethylene having a density of 0.96 gm./cc. and a melt index of 0.2 (ASTM D1238–57T Condition E) and measuring over all 4¾ inches wide, 5¾ inches long, 1½ inches deep and nominally 10 mils thick and having tapered walls and a 3/16 inch outward extending flange on its open face was pulled from a nested stack of these containers by a denesting device and placed on the platform 3 of this machine. 0.38 second after it was released by the denester it was pushed by arm 5 onto rotatable platform 11. 0.67 second after release suction was applied to cup 13 to hold the container to the platform. 0.75 second after release the platform turned the container up side down, then 1.04 second after the release the suction on cup 13 was released and the container dropped onto mandrel 27 and was carried to the printing machine. 1.12 seconds after release from the denester the rotatable platform was turned back into position to receive another container. These containers were received right side up and then turned over and dropped onto a mandrel which carried them to a printing station at the rate of 40 per minute. The machine handled the containers smoothly, rotating and depositing the containers sequentially over extended periods of time with no malfunction.

Reasonable variation and modification are possible within the scope of the foregoing disclosure, the drawings, and the appended claims, the essence of which is that a method and means are provided for inverting a container, the method comprising positioning a container on a stationary platform, pushing the container onto a rotatable platform, holding the container on the rotatable platform, rotating the platform to invert said container, and releasing the container; said apparatus comprising means for positioning the container on a stationary platform, a stationary platform, a rotatable platform, means for holding the said container on said rotatable platform, means for moving said container from said stationary platform to said rotatable platform, means for rotating said rotatable platform around one of its ends, means for releasing the container.

I claim:
1. An apparatus for inverting an open top container comprising a stationary platform for positioning said container,
    (a) a pusher arm pivoted at one end and having a means for pushing the container on the other end,
        (1) a first cam follower on said arm,
        (2) first cam surface operably engaging said first cam follower and actuating said pusher arm, said first cam being attached to a rotatable first shaft,
    (b) a pivotable platform,
    (c) a suction means,
        (1) means for drawing a vacuum in said suction means,
        (2) a valve means for actuating said means for drawing a vacuum,
        (3) a second cam follower operably connected to said valve means,
        (4) a second cam surface operably engaging said second cam follower to control the actuation of said valve means,
    (d) a reciprocatable member,
        (1) a third cam surface to actuate movement of said reciprocatable member,
        (2) a third cam follower attached to said reciprocatable member operably engaged to said third cam surface for actuating said reciprocatable member,
        (3) an arm rotatably attached at one end to said reciprocatable member and rigidly attached on the other end to a second shaft so that the reciprocating motion of the reciprocatable member reciprocatably rotates said second shaft; and
    (e) means operably connected to said second shaft for rotating said pivotable platform about one of its ends.

2. An apparatus according to claim 1 wherein said second cam surface is attached to said first shaft.

3. An apparatus according to claim 1 wherein said reciprocatable member is slidably attached to said first shaft.

4. An apparatus according to claim 1 wherein third cam surface is attached to said first shaft.

5. An apparatus according to claim 1 wherein said means for rotating said rotatable platform is composed of a gear reducing means connected to a third shaft, said gear reducing means transferring the reciprocating rotational motion of said second shaft to the said third shaft, and means for rigidly attaching said rotatable platform at one end to said third shaft so that as said third shaft turns said rotatable platform rotates around said end attached to said third shaft.

6. An apparatus for inverting an open top container comprising means for pushing a container onto the platform, means for holding said container on said platform with suction, means for rotating said platform around one of its ends to invert said container, said rotating means comprising a reciprocatable member slidably attached to a first shaft, a cam surface attached to said first shaft to actuate the movement of said reciprocatable member, a cam follower attached to said reciprocatable member to follow said cam surface and actuate said reciprocatable member, an arm rotatably attached at one end of said reciprocatable member and rigidly attached on the other end to a second shaft so that reciprocating motion of said reciprocatable member is transferred to reciprocating rotatable motion of said second shaft, means operably connected to said second shaft for rotating said platform about one of its ends, and means for releasing suction on said container.

7. An apparatus for inverting an open top container comprising
   (a) a stationary platform,
   (b) a pusher arm pivoted at one end and having a means for pushing a container on the other end,
   (c) a first cam surface,
   (d) a cam follower on said pusher arm operably engaged to said first cam surface to actuate said pusher arm, said first cam surface beieng attached to a rotating first shaft,
   (e) a pivotable platform,
   (f) a suction cup,
   (g) means for drawing a vacuum on said suction cup,
   (h) valve means for actuating said means for drawing a vacuum,
   (i) a second cam surface connected to said first shaft,
   (j) a cam follower connected to said valve and operably engaging said second cam surface to control actuation of said valve,
   (k) a reciprocatable member slidably attached to said first shaft,
   (l) a third cam surface attached to said first shaft to actuate the movement of said reciprocatable member,
   (m) a cam follower attached to said reciprocatable member to follow said third cam surface and actuate said reciprocatable member,
   (n) an arm rotatably attached at one end of said reciprocatable member and rigidly attached on the other end to a second shaft so that reciprocating motion of said reciprocatable member is transferred to reciprocating rotatable motion of said second shaft,
   (o) a third shaft,
   (p) a gear reducing means between said second shaft and said third shaft adapted to transfer said reciprocating rotational motion from said second shaft to said third shaft, and
   (q) means for rigidly attaching one end of said rotatable platform to said third shaft so that as said third shaft turns rotatable platform rotates around said end attached to said third shaft.

8. An apparatus for inverting an open top container comprising an invertable platform, means for positioning a container on said invertable platform, means for holding said container on said platform, means for inverting said platform, said inverting means comprising a reciprocatable member slidably attached to a first shaft, a cam surface to actuate movement of said reciprocatable member, a cam follower attached to said reciprocatable member operably engaged to said cam surface for actuating said reciprocatable member, an arm rotatably attached at one end to said reciprocatable member and rigidly attached on the other end to a second shaft so that the reciprocating motion of the reciprocatable member reciprocatably rotates said second shaft, and means operably connected to said second shaft for rotating said pivotable platform about one of its ends, means for releasing said means for holding said container on said platform.

9. Apparatus according to claim 1 wherein said pusher arm is biased in the retracted position against said first cam surface.

10. Apparatus according to claim 1 wherein said reciprocatable member is biased against said third cam surface.

11. An apparatus according to claim 7 wherein said pusher arm is biased to said first cam surface, and wherein said reciprocatable member is biased against said third cam surface.

References Cited by the Examiner

UNITED STATES PATENTS

| | | | |
|---|---|---|---|
| 1,801,309 | 4/1931 | Gipe | 214—1 |
| 2,710,103 | 6/1955 | Castello et al. | 214—1 |
| 2,852,125 | 9/1958 | Holloway | 214—312 X |
| 3,109,531 | 11/1963 | Jackson | 214—314 X |

FOREIGN PATENTS 966,764   8/1964   Great Britain.

MARVIN A. CHAMPION, *Primary Examiner.*